(12) United States Patent
Fung et al.

(10) Patent No.: US 8,692,691 B2
(45) Date of Patent: Apr. 8, 2014

(54) INFRARED LASER LANDING MARKER

(75) Inventors: Yau L. Fung, Fairfax, VA (US); Andrew J. Hill, Springfield, VA (US); Paul W. Bachelder, Fairfax, VA (US); Robert B. Mayer, Alexandria, VA (US); Blaine C. Froeschl, Clifton, VA (US); Alden K. Lum, Vienna, VA (US); Miguel P. Snyder, Fairfax, VA (US); Kim W. D. Larsen, Alexandria, VA (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 105 days.

(21) Appl. No.: 13/468,248

(22) Filed: May 10, 2012

(65) Prior Publication Data

US 2013/0300586 A1    Nov. 14, 2013

(51) Int. Cl.
| | |
|---|---|
| *G08G 5/00* | (2006.01) |
| *B64F 1/18* | (2006.01) |
| *B64F 1/00* | (2006.01) |
| *E01F 3/00* | (2006.01) |
| *B64F 1/36* | (2006.01) |
| *B64F 1/12* | (2006.01) |
| *G02B 27/20* | (2006.01) |

(52) U.S. Cl.
USPC ........... 340/947; 340/953; 340/954; 340/952; 340/950; 244/114 R; 244/116; 362/259

(58) Field of Classification Search
USPC .......................................... 340/951
See application file for complete search history.

(56) References Cited

U.S. PATENT DOCUMENTS

| | | | |
|---|---|---|---|
| 2,549,860 A | 4/1951 | Swanson | |
| 4,196,346 A * | 4/1980 | McElhannon | 340/951 |
| 4,259,658 A * | 3/1981 | Basov et al. | 340/951 |
| 4,862,164 A | 8/1989 | Croley et al. | |
| 5,986,581 A | 11/1999 | Magdaleno, II et al. | |
| 6,696,978 B2 * | 2/2004 | Trajkovic et al. | 340/936 |
| 6,783,260 B2 | 8/2004 | Machi et al. | |
| 7,023,361 B1 | 4/2006 | Wallace et al. | |
| 2005/0057351 A1 * | 3/2005 | Adams et al. | 340/461 |
| 2008/0111995 A1 * | 5/2008 | Lee et al. | 356/499 |
| 2009/0296058 A1 * | 12/2009 | Slotboom et al. | 355/53 |
| 2010/0123593 A1 * | 5/2010 | Stewart | 340/670 |
| 2011/0121654 A1 * | 5/2011 | Recker et al. | 307/66 |
| 2011/0307126 A1 * | 12/2011 | Hogstrom | 701/16 |

* cited by examiner

*Primary Examiner* — Jennifer Mehmood
*Assistant Examiner* — Pameshanand Mahase
(74) *Attorney, Agent, or Firm* — Richard J. Kim

(57) ABSTRACT

An infrared laser landing marker system provides a capability to mark a boundary line of varying lengths with near infrared lasers, e.g., of the order 8xx nm. This system can be either directly operated or remotely operated via satellite communications and is compatible with currently fielded night vision goggles. Two modules, placed at either end of boundary, self align to each other and then proceed to mark a boundary edge of a landing zone with an infrared laser line.

18 Claims, 3 Drawing Sheets

Side

INFRARED LASER LANDING MARKER

GOVERNMENT INTEREST

The invention described herein may be manufactured, used, sold, imported, and/or licensed by or for the Government of the United States of America.

FIELD OF THE INVENTION

This invention relates to illumination systems for military aircraft, and more particularly to infrared laser landing markers.

BACKGROUND OF THE INVENTION

The typical method of marking a temporary boundary or landing zone is through the use of beacons that are arranged around a safe landing area, or by marking the area with hand held, high powered lasers. These methods require personnel to be on the ground and in the vicinity of the landing area in order to place and operate the markers. Requiring ground operators to be present also limits safety, efficiency and jeopardizes the success of the operation. When lasers are used to mark the boundaries of the area, they are often hand operated and rely on the skill and accuracy of the operator.

SUMMARY OF THE INVENTION

An exemplary Infrared Laser Landing Marker is comprised of two modules placed at opposite ends of a landing zone. Each module has the capability of detecting and aligning to the opposing module, and to scan a laser line on the ground out to the opposing module creating a solid line along one edge of a landing zone. These modules can be adjusted to be used on landing zones of varying length.

In one aspect, an exemplary infrared laser landing marker system comprises placing two opposing infrared laser landing marker modules at opposite ends of a predetermined area to mark a landing zone, each said module being mounted to a platform or a tripod and stationed at each respective end along a boundary edge of said landing zone; said two opposing modules being oriented facing each other with a horizontal tolerance of about 20 degrees, respectively; activating the modules to emit an alignment laser for the opposing module to align to; detecting and aligning with the respective opposing module by each of the modules for alignment; and disabling the respective alignment laser upon completion of said alignment and generating a near infrared line generating laser about half the distance of the landing zone, creating one continuous boundary line spanning the length of the landing zone.

In another aspect, an infrared laser landing marker module capable of detecting an opposing module beacon for self alignment comprises an alignment laser to function as a point source beacon for the opposing module to detect for self alignment; a quad photo-detecting sensor having four quadrants to detect an alignment laser from said opposing module, the four quadrants of the sensor capable of enabling compare and determine for alignment to said opposing module; a line generating laser for activation upon completion of alignment; a processor and electronics board for computations to determine the needed adjust alignment; and a pan motor and a tilt stepper motor for adjustment of azimuth and elevation of the module.

Yet, in another aspect, an exemplary infrared laser landing marker operating method comprises placing one infrared laser landing marker module at one end and another module at another end of a landing zone to define the length of a landing strip; disposing the modules to oppose each other within a 20 degree horizontal tolerance; activating the infrared laser landing marker by powering the respective module; selecting a runway distance setting to closely approximate the landing strip length of the landing zone; activating an alignment laser for each module to alignment with respect to the opposing module; and activating a line generator.

As variously disclosed, greater accuracy in marking a boundary edge of a landing zone can be achieved, including the ability for long term pre-placement and remote operation. The ability of the modules to self-align to each other reduces risk and the time it takes to correctly place the modules.

BRIEF DESCRIPTION OF THE DRAWINGS

Additional advantages and features will become apparent as the subject invention becomes better understood by reference to the following detailed description when considered in conjunction with the accompanying drawings wherein.

DETAILED DESCRIPTION

Figure 1:
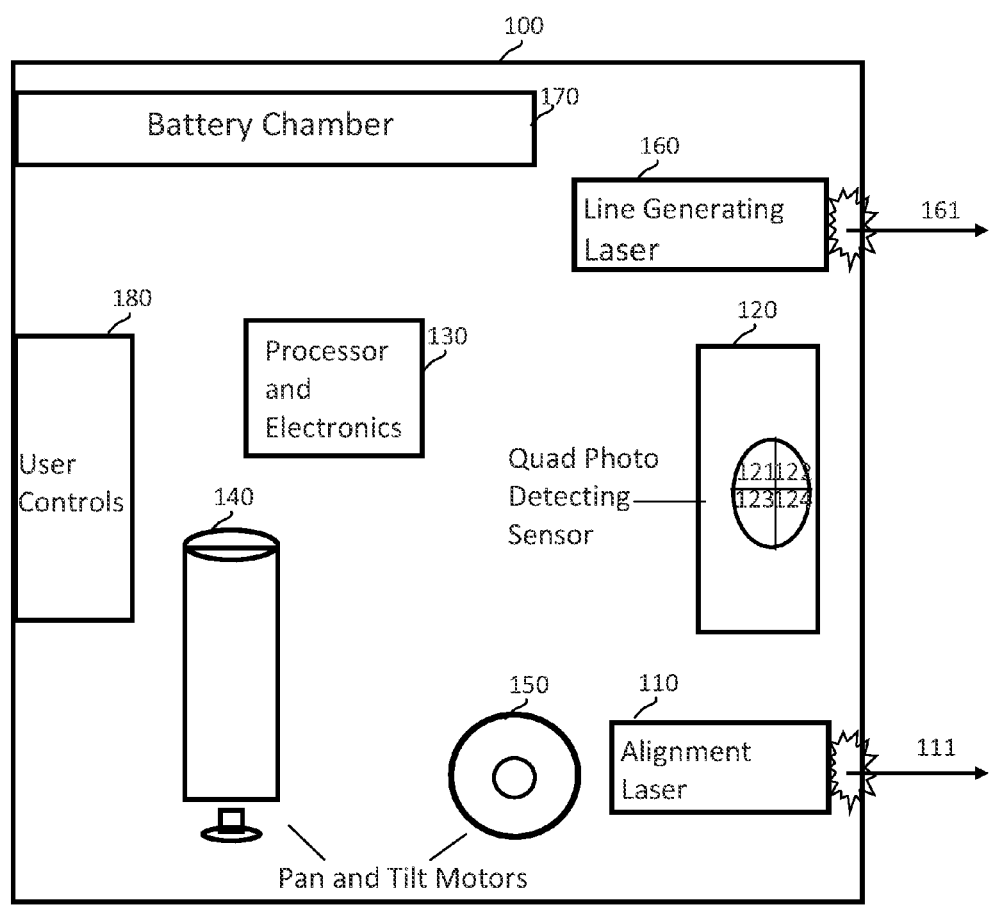
FIG. 1 shows an exemplary module of an infrared laser landing marker (IRLLM)

Apparatus: There are several components that are integrated together in one IRLLM module that include mechanical, electrical and optical parts. FIG. 1 shows an exemplary module of an infrared laser landing marker (IRLLM) 100 with the major components that make up such an exemplary IRLLM Module. The capability to detect an opposing module is disclosed for the ability of self alignment. To accomplish self alignment, the alignment laser 110 is used to act as a point source beacon for another module to detect. This laser is detected by a quad photo-detecting sensor 120. The four quadrants (e.g., 121-124) of the sensor 120 act as, or enable, comparators to determine alignment to the opposing module. Differences in signal strength across the sensor 120 determine the directions the module must move in order to self align. The calculations to determine how much to adjust alignment is performed by the processor and electronics board 130. The azimuth and elevation of the module 100 is adjusted by one pan 140 and one tilt stepper 150 motor. This process is repeated until the module 100 is completely aligned. Once alignment is accomplished, the module 100 will deactivate the alignment laser 110 and activate the line generating laser 160. The battery chamber 170 supplies power to the sensor 120, motors (e.g., 140, 150), electronics and lasers (e.g., 110, 120, 130) to enable the modules usage in remote locations that are without electricity. User controls (e.g., 180) are located on the back of the module 100 enabling a user to activate and deactivate the module 100 physically or remotely if the module has been pre-placed prior to a landing operation.

System: As variously shown in FIGS. 2*a* and 2*b*, the IRLLM (Infrared Laser Landing Marker) is a self aligning, covert marker for temporary and ad-hoc landing zones. One IRLLM module is comprised of electrical, optical and mechanical components as described in FIG. 1; there are two such modules 200*a* and 200*b* per one IRLLM system 200.

Each module is mounted to a tripod (280a and 280b), but can be mounted to other stable platforms as well.

Figure 2A:
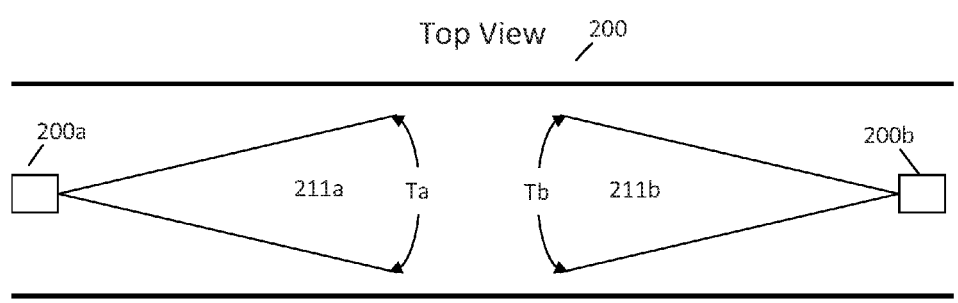
FIG. 2*a* shows a top view of an exemplary infrared laser landing marker (IRLLM) system in operation.

FIG. 2a shows atop view of an exemplary infrared laser landing marker (IRLLM) system 200 in operation. On a predetermined area for landing, one IRLLM module (200a or 200b) is stationed at each end along a boundary edge of a landing zone. The two modules (200a & 200b) must be oriented facing each other with a horizontal tolerance (Ta and Tb) of 20 degrees, respectively. When activated, each module (200a or 200b) emits an alignment laser (211a or 211b) for the opposing module to align to.

Figure 2B:
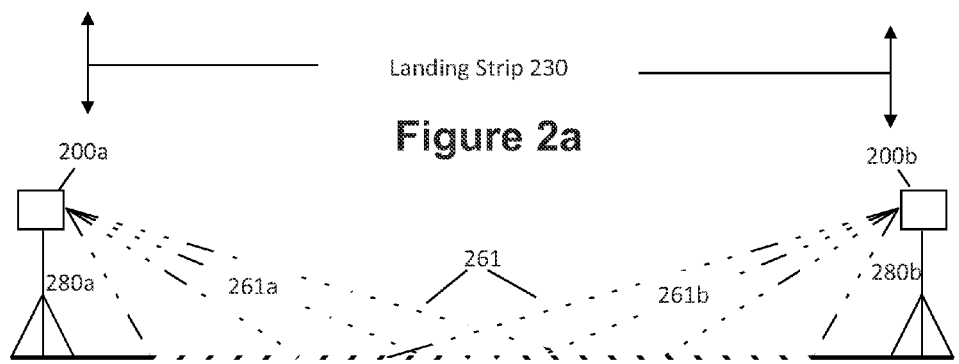
FIG. 2*b* shows a side view of an exemplary infrared laser landing marker (IRLLM) system in operation.

FIG. 2b shows a side view of such an exemplary IRLLM system in operation. Once said alignment is complete, the respective alignment lasers 211a and 211b are disabled and each module (200a and 200b) will generate a near infrared line generating laser (261a and 261b) about half the distance of the landing zone, creating one continuous boundary line 261 (a composite of 261a and 261b) spanning the length of the landing zone (e.g., 230). This line spanning the landing zone (e.g., landing strip 230) is visible only to detectors sensitive to wavelengths in the range of about 800-899 nm, such as night vision goggles.

Figure 3:
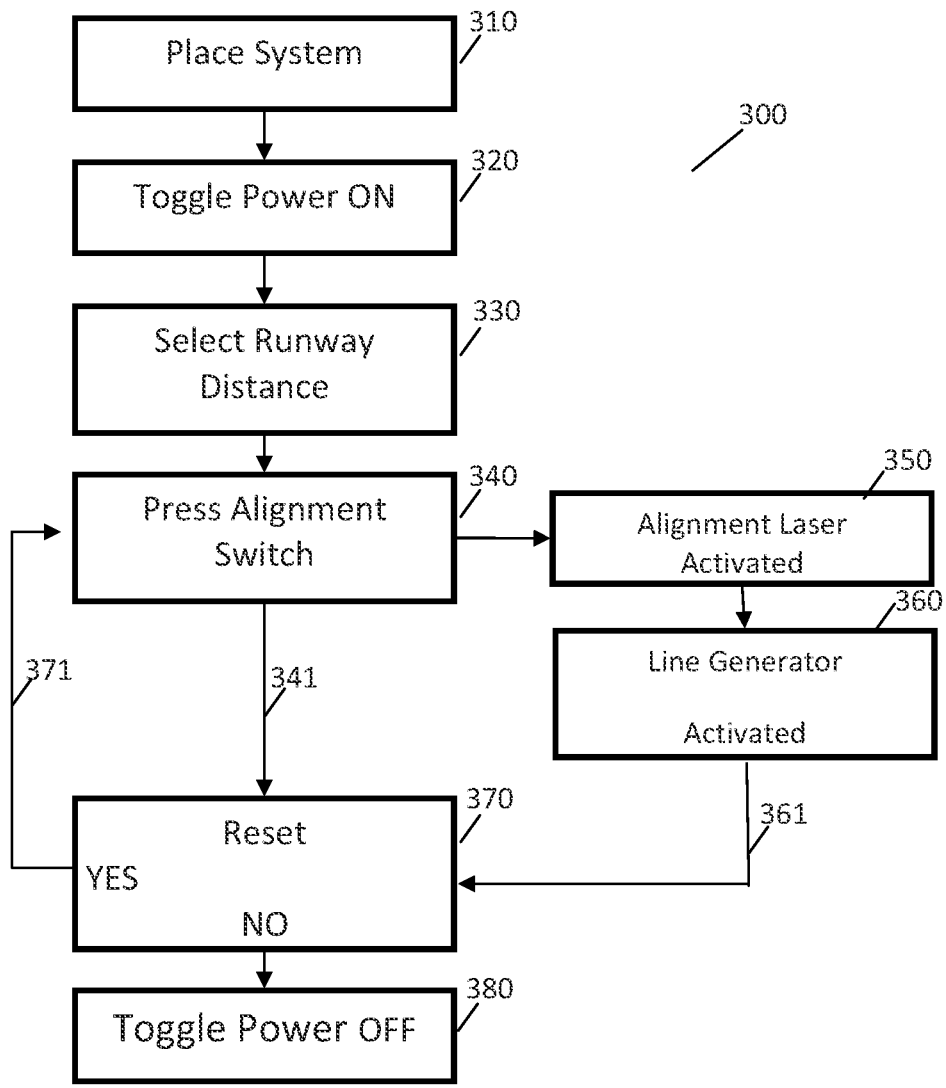
FIG. 3 shows an exemplary process flowchart of an infrared laser landing marker (IRLLM) operation.

Method: FIG. 3 shows an exemplary infrared laser landing marker (IRLLM) flowchart. Referring to FIG. 3, such a method 300 uses an Infrared Laser Landing Marker, e.g., 100, 200a or 200b as described with respect to FIGS. 1 and 2. Starting with step 310, an operator can place the system 200 with one module 200a at one end and another module 200b at another end of a landing zone to define the length of a landing strip 230. They are disposed facing each other within a 20 degree horizontal tolerance (Ta, Tb). Once placed, in step 320, the user activates the system 200 by toggling the power ON of the respective module (200a and 200b), either physically on the system or remotely via communications. After powering on the system, in step 330, runway distance is selected, e.g., to the setting closest to the actual landing strip length 230 of the landing zone. In step 340, pressing the alignment switch will activate the alignment laser (e.g., 110 of FIG. 1) for each module (e.g., 200a or 200b of FIG. 2) to self-align to one another as depicted in step 350.

After the alignment of step 350 is accomplished, the line generator is activated. The activation of line generator as depicted in step 360 scans a near infrared laser line, e.g., along one boundary edge of a designated landing zone (e.g., 230). As shown in branch 341 leading to the reset portion of step 370, the user has the option to reset the system if alignment fails or if he wants to realign the system. For example, further shown leading out of step 370 is a yes branch 371 leading back to step 340 for pressing the alignment switch. Once an operation (e.g., of the line generator activation branch of 361) is completed, the user will toggle the power off as shown in step 380 to deactivate the IRLLM system.

It is obvious that many modifications and variations of the present invention are possible in light of the above teachings. It is therefore to be understood that within the scope of the appended claims, the invention may be practiced otherwise than as described.

What is claimed is:

1. An infrared laser landing marker system, comprising:
   placing two opposing infrared laser landing marker modules at opposite ends of a predetermined area to mark a landing zone, each said module being mounted to a platform or a tripod and stationed at each respective end along a boundary edge of said landing zone;
   orienting said two opposing infrared laser landing marker modules to face each other with a horizontal tolerance of about 20 degrees, respectively;
   activating the modules to emit an alignment laser for the opposing module to align to;
   detecting and aligning with the respective opposing module by each of the modules for alignment; and
   disabling the respective alignment laser upon completion of said alignment; and
   each infrared laser landing marker module generating a near infrared line generating laser about half the distance of the landing zone toward the respective opposing module, the composite of which near infrared line generating lasers creating one continuous boundary line spanning the length of the landing zone.

2. The infrared laser landing marker system according to claim 1, wherein said generation of a near infrared line generating laser is based on scanning a laser line to trace a solid line along said boundary edge of the landing zone.

3. The infrared laser landing marker system according to claim 1, wherein said near infrared line generating laser is visible only to detectors or night vision goggles to wavelengths in the range of about 800-899 nm wavelengths.

4. The infrared laser landing marker system according to claim 1, wherein said modules can be adjusted to accurately define a boundary edge of a landing zone of varying length.

5. The infrared laser landing marker system according to claim 1, wherein the opposing modules self-align as a pair, thereby reducing the risk and the time it takes to configure the modules.

6. The infrared laser landing marker system according to claim 5, wherein the self-aligning modules are capable of long term pre-placement and/or remote operation to serve as a covert marker for temporary and ad-hoc landing zones.

7. An infrared laser landing marker module capable of detecting an opposing module beacon of an infrared laser landing marker system according to claim 1 for self alignment, comprising:
   an alignment laser to function as a point source beacon for the opposing module to detect for self alignment;
   a quad photo-detecting sensor having four quadrants to detect an alignment laser from said opposing module, the four quadrants of the sensor capable of enabling compare and determine for alignment to said opposing module;
   a line generating laser for activation upon completion of alignment;
   a processor and electronics board for computations to determine the needed adjust alignment; and
   a pan motor and a tilt stepper motor for adjustment of azimuth and elevation of the module.

8. The infrared laser landing marker module according to claim 7, comprising a tripod or like platform for mounting said module.

9. The infrared laser landing marker module according to claim 7, wherein upon said completion of alignment, the alignment laser is deactivated and the line generating laser is activated.

10. The infrared laser landing marker module according to claim 7, wherein differences in signal strength across the sensor determine the directions the module need to move in order to self align.

11. The infrared laser landing marker module according to claim 7, wherein said alignment is repeated until the module is best aligned.

12. The infrared laser landing marker module according to claim 7, comprising a battery chamber to supply power and enable remote operation of the module without the use of external electricity.

13. The infrared laser landing marker module according to claim 7, comprising user controls located on a back of the module to enable a user to activate and deactivate the module on location, or by remote control in case of a pre-placement prior to a landing operation.

14. An infrared laser landing marker operating method, comprising:
   placing one infrared laser landing marker module at one end and another module at another end of a landing zone to define the length of a landing strip;
   disposing the modules to oppose each other within a 20 degree horizontal tolerance;
   activating the infrared laser landing marker by powering the respective module;
   selecting a runway distance setting to closely approximate the landing strip length of the landing zone;
   activating an alignment laser for each module to alignment with respect to the opposing module; and
   activating a line generator, each infrared laser landing marker module generating a near infrared line generating laser about half the distance of the landing zone toward the respective opposing module, the composite of which near infrared line generating lasers creating one continuous boundary line spanning the length of the landing zone.

15. The infrared laser landing marker operating method according to claim 14, wherein activating said line generator scans a near infrared laser line along one boundary edge of said landing zone.

16. The infrared laser landing marker operating method according to claim 14, wherein said modules can be reset if alignment fails, or to realign the modules.

17. The infrared laser landing marker operating method according to claim 14, wherein the modules can be powered off to deactivate the infrared laser landing marker.

18. The infrared laser landing marker operating method according to claim 14, wherein the modules can be powered on either locally or remotely via communications.

* * * * *